United States Patent
Choi et al.

(10) Patent No.: US 12,334,264 B2
(45) Date of Patent: Jun. 17, 2025

(54) MULTILAYER CERAMIC ELECTRONIC COMPONENT

(71) Applicant: SAMSUNG ELECTRO-MECHANICS CO., LTD., Suwon-si (KR)

(72) Inventors: Du Won Choi, Suwon-si (KR); Ji Hong Jo, Suwon-si (KR); Seok Kyoon Woo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 146 days.

(21) Appl. No.: 18/241,392

(22) Filed: Sep. 1, 2023

(65) Prior Publication Data

US 2024/0038446 A1 Feb. 1, 2024

Related U.S. Application Data

(60) Continuation of application No. 17/117,210, filed on Dec. 10, 2020, now Pat. No. 11,784,001, which is a
(Continued)

(30) Foreign Application Priority Data

Oct. 10, 2018 (KR) .................... 10-2018-0120664

(51) Int. Cl.
*H01G 4/12* (2006.01)
*H01G 4/008* (2006.01)
(Continued)

(52) U.S. Cl.
CPC ........... *H01G 4/1227* (2013.01); *H01G 4/008* (2013.01); *H01G 4/012* (2013.01); *H01G 4/2325* (2013.01); *H01G 4/129* (2013.01); *H01G 4/30* (2013.01)

(58) Field of Classification Search
CPC ...... H01G 4/1227; H01G 4/008; H01G 4/012; H01G 4/2325; H01G 4/129; H01G 4/30
See application file for complete search history.

(56) References Cited

U.S. PATENT DOCUMENTS

| | | |
|---|---|---|
| 6,243,254 B1 | 6/2001 | Wada et al. |
| 7,239,501 B2 | 7/2007 | Hiramatsu et al. |
| | (Continued) | |

FOREIGN PATENT DOCUMENTS

| | | |
|---|---|---|
| CN | 104576048 A | 4/2015 |
| CN | 104867673 A | 8/2015 |
| | (Continued) | |

OTHER PUBLICATIONS

Office Action issued on Oct. 17, 2023, in the corresponding Korean Patent Application No. 10-2018-0120664 with English translation.
(Continued)

*Primary Examiner* — Michael P Mcfadden
(74) *Attorney, Agent, or Firm* — Morgan, Lewis & Bockius LLP

(57) ABSTRACT

A multilayer ceramic electronic component includes: a ceramic body including dielectric layers and a plurality of first and second internal electrodes disposed on the dielectric layers to face each other with each of the dielectric layers interposed therebetween; and first and second external electrodes disposed on external surfaces of the ceramic body and electrically connected to the first and second internal electrodes, wherein the dielectric layer includes a dielectric ceramic composition including a base material main component represented by $z(Ba_{(1-x)}Ca_{x})TiO_3-(1-z)BaTi_2O_5$ including a first main component represented by $(Ba_{(1-x)}Ca_{x})TiO_3$ and a second main component represented by $BaTi_2O_5$, $0.7 \leq z \leq 0.8$ and $0 \leq x < 0.1$.

9 Claims, 4 Drawing Sheets

Related U.S. Application Data division of application No. 16/204,856, filed on Nov. 29, 2018, now Pat. No. 10,892,096.

(51) Int. Cl.
*H01G 4/012* (2006.01)
*H01G 4/232* (2006.01)
*H01G 4/30* (2006.01)

(56) References Cited

U.S. PATENT DOCUMENTS

| | | | |
|---|---|---|---|
| 7,381,672 B2 * | 6/2008 | Hiramatsu | C04B 35/62685 501/138 |
| 9,988,310 B2 | 6/2018 | Yoon | |
| 10,892,096 B2 | 1/2021 | Choi et al. | |
| 2007/0025060 A1 | 2/2007 | Kim et al. | |
| 2007/0176248 A1 * | 8/2007 | Gaylord | H10D 64/68 257/E21.272 |
| 2009/0215605 A1 * | 8/2009 | Letz | C03B 32/02 501/5 |
| 2011/0007449 A1 | 1/2011 | Seo et al. | |
| 2011/0019333 A1 | 1/2011 | Yao | |
| 2011/0019336 A1 | 1/2011 | Fukuda et al. | |
| 2012/0081836 A1 * | 4/2012 | Yamaguchi | H01G 4/30 501/139 |
| 2015/0114700 A1 | 4/2015 | Park et al. | |
| 2015/0187497 A1 | 7/2015 | Saito et al. | |
| 2015/0243439 A1 | 8/2015 | Kwag | |
| 2015/0318110 A1 | 11/2015 | Lee et al. | |
| 2016/0240310 A1 | 8/2016 | Kim et al. | |
| 2016/0240311 A1 | 8/2016 | Lee et al. | |
| 2017/0186536 A1 | 6/2017 | Sato et al. | |
| 2017/0190626 A1 * | 7/2017 | Yoon | C04B 35/4682 |
| 2017/0213647 A1 | 7/2017 | Ahn | |
| 2017/0243695 A1 | 8/2017 | Kim et al. | |
| 2018/0130601 A1 | 5/2018 | Kim et al. | |
| 2018/0308637 A1 | 10/2018 | Nishigaki et al. | |
| 2020/0111616 A1 | 4/2020 | Choi | |
| 2020/0118751 A1 * | 4/2020 | Choi | H01G 4/1227 |
| 2020/0194178 A1 | 6/2020 | Choi | |
| 2021/0043380 A1 * | 2/2021 | Ishibe | H01G 4/232 |

FOREIGN PATENT DOCUMENTS

| | | |
|---|---|---|
| CN | 106941045 A | 7/2017 |
| CN | 107103996 A | 8/2017 |
| CN | 108063051 A | 5/2018 |
| JP | 2001-294481 A | 10/2001 |
| JP | 2011-018874 A | 1/2011 |
| JP | 2014-220324 A | 11/2014 |
| JP | 2017-120856 A | 7/2017 |
| JP | 2018-090458 A | 6/2018 |
| KR | 10-2006-0110603 A | 10/2006 |
| KR | 10-2015-0125335 A | 11/2015 |
| KR | 10-2017-0081861 A | 7/2017 |
| KR | 10-2017-0087665 A | 7/2017 |

OTHER PUBLICATIONS

Non-Final Office Action issued in U.S. Appl. No. 16/204,856 on Feb. 14, 2020.

Final Office Action issued in U.S. Appl. No. 16/204,856 on May 27, 2020.

Notice of Allowance issued in U.S. Appl. No. 16/204,856 on May 27, 2020.

* cited by examiner

I - I'

'B'

MULTILAYER CERAMIC ELECTRONIC COMPONENT

CROSS-REFERENCE TO RELATED APPLICATION

This application is the continuation application of U.S. patent application Ser. No. 17/117,210 filed on Dec. 10, 2020, which is a divisional of U.S. patent application Ser. No. 16/204,856 filed Nov. 29, 2018, now patented as U.S. Pat. No. 10,892,096, issued on Jan. 12, 2021, which claims the benefit of priority to Korean Patent Application No. filed on Oct. 10, 2018 in the Korean Intellectual Property Office, the disclosures of each are incorporated herein by reference in their entirety.

BACKGROUND

1. Field

The present disclosure relates to a multilayer ceramic electronic component, and more particularly, to a high-capacitance multilayer ceramic electronic component with excellent reliability.

2. Description of Related Art

In accordance with recent trends for miniaturized, slimmed, and multifunctional electronic products, there has also been a need for a miniaturized multilayer ceramic capacitor and a multilayer ceramic capacitor has been mounted with high integration.

A multilayer ceramic capacitor, an electronic component, is installed on the printed circuit boards (PCB) of various electronic products such as an image display device, e.g., a liquid crystal display (LCD) or a plasma display panel (PDP), a computer, a personal digital assistant (PDA), a portable phone, or the like, serving to charge or discharge electricity.

The multilayer ceramic capacitor is capable of being used as a component of various electronic devices by virtue of the advantage whereby the multilayer ceramic capacitor can be miniaturized, has an ensured high capacitance, and is easily mounted.

Recently, as an electrical component has drawn attention of industry, there has also been a need for high-reliability and high-capacitance multilayer ceramic capacitor to be used in a vehicle or an infotainment system.

In particular, as an electronic control system of an internal combustion vehicle and an electric vehicle has been increasingly used, there has been an increasing need for a multilayer ceramic capacitor that is capable of being used at a high-temperature environment.

SUMMARY

An aspect of the present disclosure may provide a multilayer ceramic electronic component, in detail, a high-reliability and high-capacitance multilayer ceramic electronic component.

According to an aspect of the present disclosure, a multilayer ceramic electronic component may include a ceramic body including dielectric layers and a plurality of first and second internal electrodes disposed on the dielectric layers to face each other with each of the dielectric layers interposed therebetween and having a first surface and a second surface opposing each other in a first direction, a third surface and a fourth surface connected to the first surface and the second surface and opposing each other in a second direction, and a fifth surface and a sixth surface connected to the first to fourth surfaces and opposing each other in a third direction; and first and second external electrodes disposed on external surfaces of the ceramic body and electrically connected to the first and second internal electrodes, wherein the dielectric layer includes a dielectric ceramic composition including a base material main component represented by $z(Ba_{(1-x)}Ca_x)TiO_3\text{-}(1\text{-}z)BaTi_2O_5$ including a first main component represented by $(Ba_{(1-x)}Ca_x)TiO_3$ and a second main component represented by $BaTi_2O_5$, $0.7 \leq z \leq 0.8$ and $0 \leq x < 0.1$.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
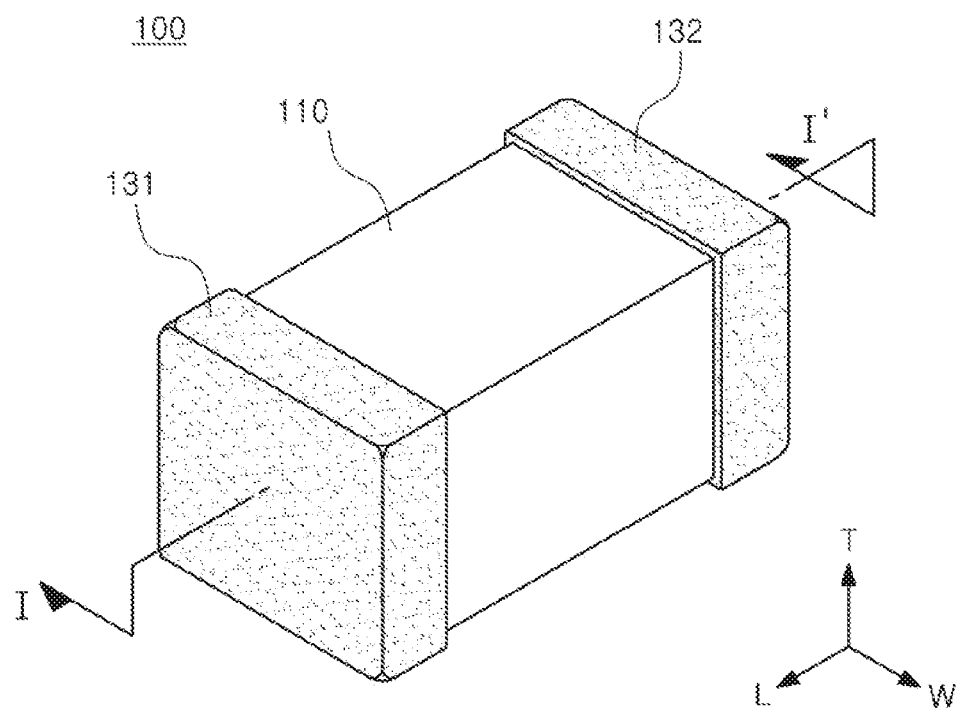
FIG. 1 is a schematic diagram of a multilayer ceramic capacitor according to an exemplary embodiment in the present disclosure.

FIG. 1 is a schematic diagram of a multilayer ceramic capacitor according to an exemplary embodiment in the present disclosure.

Figure 2:
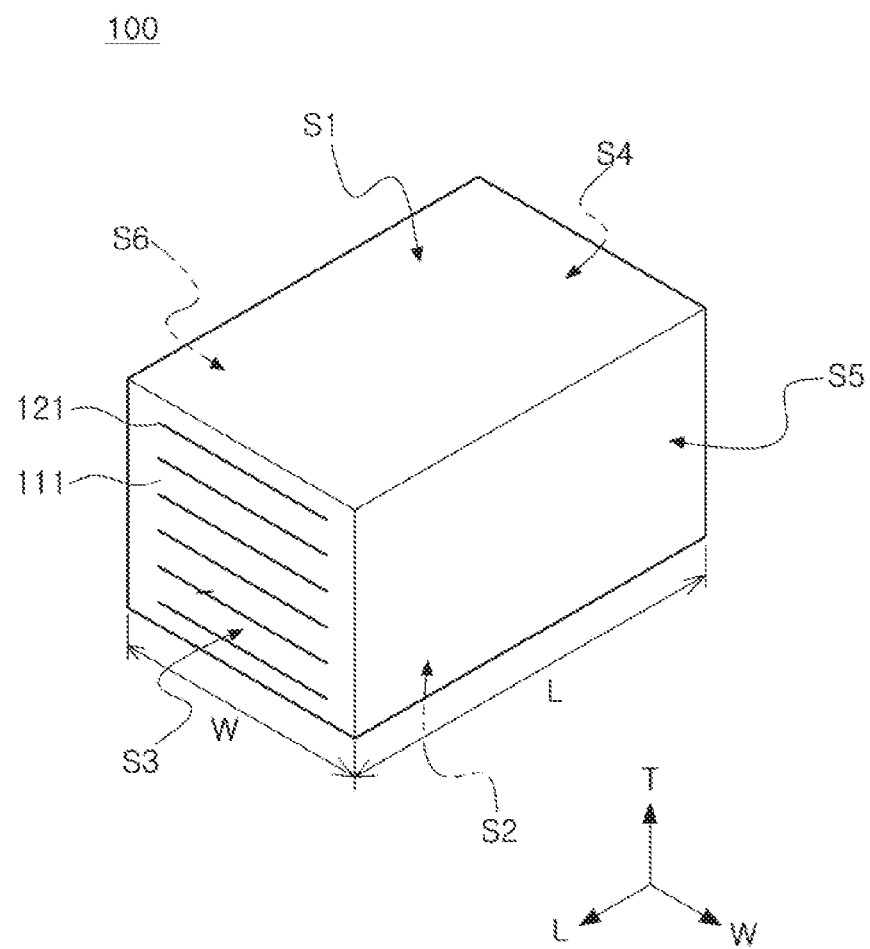
FIG. 2 is a schematic diagram of a ceramic body according to an exemplary embodiment in the present disclosure.

FIG. 2 is a schematic diagram of a ceramic body according to an exemplary embodiment in the present disclosure.

Figure 3:
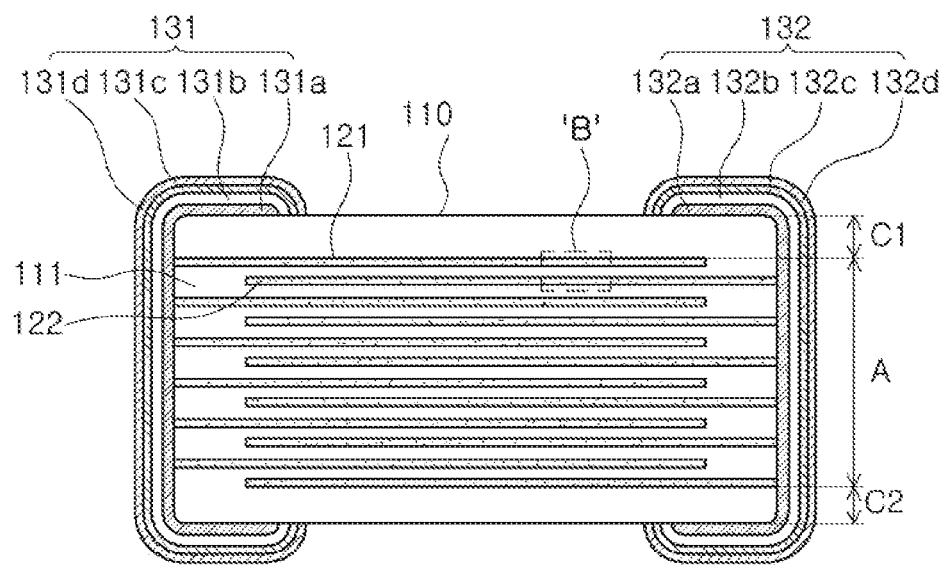
FIG. 3 is a cross-sectional view taken along I-I' of FIG. 1 according to an exemplary embodiment in the present disclosure.

FIG. 3 is a cross-sectional view taken along I-I' of FIG. 1 according to an exemplary embodiment in the present disclosure.

Figure 4:
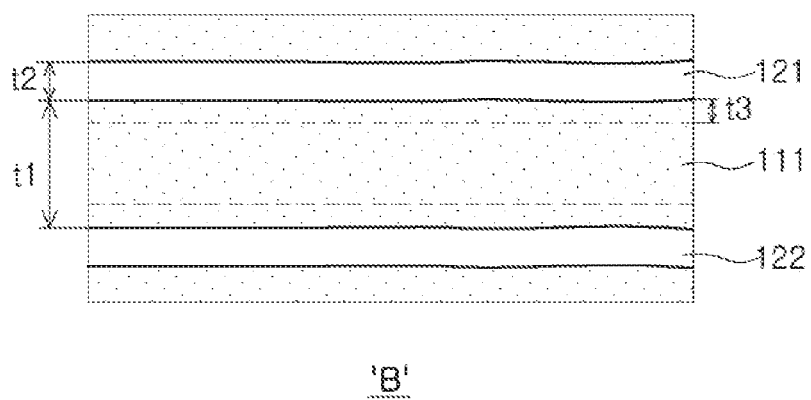
FIG. 4 is an enlarged view of a region B of FIG. 3.

FIG. 4 is an enlarged view of a region B of FIG. 3. Referring to FIGS. 1 to 4, a multilayer ceramic electronic component 100 according to an exemplary embodiment in the present disclosure may include a ceramic body 110 that includes dielectric layers 112 and a plurality of first and second internal electrodes 121 and 122 disposed on the dielectric layers 111 to face each other with each of the dielectric layers interposed therebetween and has a first surface S1 and a second surface S2 opposing each other in a first direction, a third surface S3 and a fourth surface S4 connected to the first surface S1 and the second surface S2 and opposing each other in a second direction, a fifth surface S5 and a sixth surface S6 connected to the first to fourth surfaces and opposing each other in a third direction, and first and second external electrodes 131 and 132 disposed on external surfaces of the ceramic body 110 and are electrically connected to the plurality of first and second internal electrodes 121 and 122.

Hereinafter, a multilayer ceramic electronic component according to an exemplary embodiment in the present disclosure is described and, in particular, a multilayer ceramic capacitor is described but the multilayer ceramic electronic component is not limited to the multilayer ceramic capacitor.

With regard to a multilayer ceramic capacitor according to an exemplary embodiment in the present disclosure, a length direction is defined as direction 'L' of FIG. 1, a width direction is defined as direction 'W' of FIG. 1, and a 'thickness direction' is defined as direction 'T'. Here, the thickness direction may be used in the same concept as a direction in which dielectric layers are stacked, i.e., a stack direction.

According to an exemplary embodiment in the present disclosure, the ceramic body 10 may be shaped like, but is not particularly limited to, a hexahedron as illustrated in the drawings.

The ceramic body 110 may include the first surface S1 and the second surface S2 opposing each other in the first direction, the third surface S3 and the fourth surface S4 connected to the first surface S1 and the second surface S2 and opposing each other in the second direction, and the fifth surface S5 and the sixth surface S6 connected to the first to fourth surfaces and opposing each other in the third direction.

The first surface S1 and the second surface S2 may be defined as surfaces that face each other in the thickness direction of the ceramic body 110, i.e., the first direction, the third surface S3 and the fourth surface S4 may be defined as surfaces that face each other in the length direction of the ceramic body 110, i.e., the second direction, and the fifth surface S5 and the sixth surface S6 may be defined as surfaces that face each other in the width direction of the ceramic body 110, i.e., the third direction.

One end of the plurality of first and second internal electrodes 121 and 122 formed in the ceramic body 110 may be exposed out of the third surface S3 or the fourth surface S4 of the ceramic body.

The internal electrodes 121 and 122 may have different polarities and the first internal electrode 121 and the second internal electrode 122 may be provided in one pair.

One end of the first internal electrode 121 may be exposed out of the third surface S3 and one end of the second internal electrode 122 may be exposed out of the fourth surface S4.

The other end of the first internal electrode 121 and the second internal electrode 122 may be formed at a predetermined interval from the fourth surface S4 or the third surface S3, which is described below in detail.

The first and second external electrodes 131 and 132 may be formed on the third surface S3 and the fourth surface S4 of the ceramic body and may be electrically connected to the internal electrodes.

The ceramic body 110 may include an active portion A that facilitates formation of capacitance of a capacitor, and an upper cover portion C1 and a lower cover portion C2 that are respectively formed on upper and lower portions of the active portion as upper and lower margin portions.

The active portion A may be formed by repeatedly stacking the plurality of first and second internal electrodes 121 and 122 on the dielectric layers 111.

The upper cover portion C1 and the lower cover portion C2 may have the same material and configuration as the dielectric layer 111 except that the upper and lower cover portions C1 and C2 do not include an internal electrode.

That is, the upper cover portion C1 and the lower cover portion C2 may include a ceramic material and, for example, may include a barium titanate ($BaTiO_3$)-based ceramic material.

The upper cover portion C1 and the lower cover portion C2 may be formed by stacking a single dielectric layer or two or more dielectric layers on upper and lower surfaces of the active portion A in up and down directions to basically prevent an internal electrode from being damaged by physical or chemical stress.

The first and second internal electrodes 121 and 122 may be formed of a conductive paste including one or more of material, but is not particularly limited to, for example, silver (Ag), lead (Pb), platinum (Pt), nickel (Ni), and copper (Cu).

The multilayer ceramic capacitor according to an exemplary embodiment in the present disclosure may include a first external electrode 131 that is electrically connected to the first internal electrode 121 and a second external electrode 132 that is electrically connected to the second internal electrode 122.

The first and second external electrodes 131 and 132 may be electrically connected to the first and second internal electrodes 121 and 122 to form capacitance and the second external electrode 132 maybe connected to a different potential from the first external electrode 131.

The first and second external electrodes 131 and 132 may be disposed on the third surface S3 and the fourth surface S4, respectively, in the length direction of the ceramic body 110, i.e., the second direction and, in this case, may extend onto the first surface S1 and the second surface S2 in the thickness direction of the ceramic body 110, i.e., the first direction.

The external electrodes 131 and 132 may be disposed on an external surface of the ceramic body 110 and may include electrode layers 131a and 132a that are electrically connected to the internal electrodes 121 and 122 and conductive resin layers 131b and 132b disposed on the electrode layers 131a and 132a.

The electrode layers 131a and 132a may include conductive metal and glass.

The conductive metal used in the electrode layers 131a and 132a is not particularly limited as long as the conductive metal is electrically connectable to the internal electrode to form capacitance and, for example, may include one or more selected from the group consisting of copper (Cu), silver (Ag), nickel (Ni), and an alloy thereof. For example, the conductive metal may include copper (Cu).

The electrode layers 131a and 132a may be formed by coating conductive paste prepared by adding glass frit to conductive metal powder particles and then sintering the resultant.

The conductive resin layers 131b and 132b may be formed on the electrode layers 131a and 132a to completely cover the electrode layers 131a and 132a.

The conductive resin layers 131b and 132b are formed to completely cover the electrode layers 131a and 132a and, thus, a distance to an end portion of the conductive resin layers 131b and 132b disposed on the first surface S1 and the second surface S2 of the ceramic body 110 is longer than a distance to an end portion of the electrode layers 131a and 132a disposed on the first surface S1 and the second surface S2 of the ceramic body 110.

Base resin included in the conductive resin layers 131b and 132b is not particularly limited as long as the base resin has adhesive properties and impact absorbing properties and is mixed with conductive metal powder particles to form paste and may include, for example, epoxy-based resin.

Conductive metal included in the conductive resin layers 131b and 132b is not particularly limited as long as the conductive metal is electrically connectable to the electrode layers 131a and 132a and may include one or more selected from the group consisting of, for example,
copper (Cu), silver (Ag),
nickel (Ni), and an alloy thereof.

Plating layers 131c, 132c, 131d, and 132d may be further disposed on the conductive resin layers 131b and 132b.

The plating layers 131c, 132c, 131d, and 132d may be disposed on the conductive resin layers 131b and 132b to completely cover the
conductive resin layers 131b and 132b. The plating layers 131c, 132c, 131d, and 132d may include Ni plating layers 131c and 132c disposed on the conductive resin layers 131b and 132b and Pd plating layers 131d and 132d disposed on the Ni plating layers 131c and 132c.

According to an exemplary embodiment in the present disclosure, the dielectric layer 111 may include dielectric ceramic composition including a base material main component represented by $z(Ba_{(1-x)}Ca_x)TiO_3$-$(1-z)BaTi_2O_5$ including a first main component represented by $(BaTi_{1-x}Ca_x)TiO_3$ and a second main component represented by $BaTi_2O_5$, and $0.7 \leq z \leq 0.8$ and $0 \leq x \leq 0.1$.

Recently, as an electrical component has drawn attention of the field, there has also been a need for high-reliability and high-capacitance multilayer ceramic capacitor to be used in a vehicle or an infotainment system.

In particular, as an electronic control system of an internal combustion vehicle and an electric vehicle has been increasingly used, there has been an increasing need for a multilayer ceramic capacitor that is capable of being used at a high-temperature environment.

Currently, a main dielectric material of a high-capacitance multilayer ceramic capacitor is barium titanate ($BaTiO_3$) and, in this regard, a ceramic body needs to be sintered in a reduction condition while using a Ni internal electrode and, thus, the dielectric material requires non-reduction property.

However, as capacitance is largely reduced in an environment of 150° C. or greater due to the unique property of barium titanate ($BaTiO_3$) oxide, there is a problem in that it is difficult to ensure electrical properties depending on temperature, which is required by an electrical product.

In addition, there is a need for a multilayer ceramic capacitor that is available in a high-temperature environment, which is a situation in which it is almost impossible to extensively use the multilayer ceramic capacitor up to 200° C.,
by applying a new composition.

According to an exemplary embodiment in the present disclosure, the dielectric layer 111 may include two types of main components of a first main component represented by $(Ba_{(1-x)}Ca_x)TiO_3$ and a second main component represented by
$BaTi_2O_5$ and, in this regard, contents of the respective components may be adjusted to stably ensure a high-temperature capacitance variation rate and, simultaneously, to embody a high-capacitance multilayer ceramic capacitor.

In detail, the dielectric layer 111 may include a dielectric ceramic composition including a base material main component represented by $z(Ba_{1-x}Ca_xTiO_3$-$(1-z)BaTi_2O_5$ including a first main component represented by $(Ba_{(1-x)}Ca_x)TiO_3$ and a second main component represented by $BaTi_2O_5$, $0.7 \leq z \leq 0.8$ and $0 \leq x \leq 0.1$ to stably ensure a high-temperature capacitance variation rate and, simultaneously, to embody a high-capacitance multilayer ceramic capacitor.

Hereinafter, each component of a dielectric ceramic composition included in a dielectric layer according to an exemplary embodiment in the present disclosure is described in more detail.

a) Base Material Powder Particles

According to an exemplary embodiment in the present disclosure, the dielectric layer 111 may include a base material main component represented by $z(Ba_{(1-x)}Ca_x)TiO_3$-$(1-z)BaTi_2O_5$ including a first main component represented by $(Ba_{(1-x)}Ca_x)TiO_3$ and a second main component represented by $BaTi_2O_5$.

The base material main component may be included in the form of powder particles and the first main component as first base material powder particles and the second main component
as second base material powder particles may be included in the dielectric ceramic composition.

In the above expression, z satisfies $0.7 \leq z \leq 0.8$ and x satisfies $0 \leq x < 0.1$.

The first main component may be represented by $(Ba_{(1-x)}Ca_x)TiO_3$ and the BCT material may be a ferroelectric material as a material used as a general dielectric base material.

The second main component maybe represented by $BaTi_2O_5$.

$BaTi_2O_5$ that is the second main component may have high ferroelectric transition temperature compared with $(Ba_{(1-x)}Ca_x)TiO_3$ that is the first main component.

Accordingly, when $BaTi_2O_5$ that is the second main component is used as a main component or is used alone, a high-temperature capacitance variation rate may be stably ensured due to high ferroelectric transition temperature characteristics.

However, when $BaTi_2O_5$ is used as a main component or is used alone, an excessively large amount of titanium (Ti) is present compared with $BaTiO_3$ in the prior art and, thus, there is a problem in that titanium (Ti) reacts with nickel (Ni) included in the internal electrode and nickel (Ni) is diffused into the dielectric layer.

Accordingly, there is a problem in that a dielectric constant of a multilayer ceramic capacitor is lowered.

That is, when $(Ba_{(1-x)}Ca_x)TiO_3$ that is the first main component is used alone, there is a problem in that it is possible to embody a high-capacitance multilayer ceramic capacitor but a high-capacitance variation rate is not stably ensured due to a high dielectric constant.

When $BaTi_2O_5$ that is the second main component is used as a main component or is used alone, there is a problem in that a high-temperature capacitance variation rate is stably ensured but a dielectric constant is lowered due to high ferroelectric transition temperature properties.

Accordingly, to stably ensure a high-temperature capacitance variation rate and, simultaneously, to embody a high-capacitance multilayer ceramic capacitor, according to an exemplary embodiment in the present disclosure, the dielectric layer 111 may include two types of main components of a first main component represented by $(Ba_{(1-x)}Ca_x)TiO_3$ and a second main component represented by $BaTi_2O_5$ and, contents of these components may be adjusted.

In detail, z may be adjusted to satisfy $0.7 \leq z \leq 0.8$ and, thus, 70 mol % to 80 mol % of $(Ba_{(1-x)}Ca_x)TiO_3$ as the first main component based on 100 mol % of a base material main component and the other 20 moo to 30 mol % of $BaTi_2O_5$ as the second main component may be included in the base material main component.

When z is less than 0.7, a content of $(Ba_{(1-x)}Ca_x)TiO_3$ as the first main component is low and, thus, there is a problem in that it is difficult to embody a high-capacitance multilayer ceramic capacitor.

On the other hand, when z is greater than 0.8, a content of $(Ba_{(1-x)}Ca_x)TiO_3$ as the first main component is high and a content of $BaTi_2O_5$ as the second main component is relatively low and, thus, it is difficult to stably ensure a high-temperature capacitance variation rate.

z may be adjusted to satisfy $0.7 \leq z \leq 0.8$ to stably ensure a high-temperature capacitance variation rate and, simultaneously, to embody a high-capacitance multilayer ceramic capacitor.

The first main component may be represented by $(Ba_{(1-x)}Ca_x)TiO_3$ and x may satisfy $0 \leq x < 0.1$.

That is, calcium (Ca) with a content less than 10 mol % and including 0 mol % may be included in the first main component.

In detail, calcium (Ca) with a content equal to or less than 7 mol % and including 0 mol % may be included in the first main component and, thus, $0 \leq x \leq 0.7$ may be satisfied.

x may be equal to or greater than 0 and, when x is 0, the first main component may be $BaTiO_3$.

The base material main component of the dielectric ceramic composition may be formed in a solid solution formed by solidifying the first main component and the second main component.

When the base material powder particles are solidified with each other, the base material powder particles may be a single phase and, in this case, a high-temperature capacitance variation rate, a dielectric constant, and so on may be excellent compared with the case in which two materials are mixed.

An average particle diameter of the first base material powder particles as the first main component and the second base material powder particles as the second main component may be equal to or less than 200 nm but is not limited thereto. [0079] The base material main component powder particles may have, but is not particularly limited to, an average particle diameter of powder particles of 150 nm or less.

b) First Accessory Component

According to an exemplary embodiment in the present disclosure, the dielectric ceramic composition may further include an oxide or carbonate including at least one of manganese (Mn), vanadium (V), chromium (Cr), iron (Fe), nickel (Ni), cobalt (Co), copper (Cu), and zinc (Zn) as the first accessory component.

An oxide or carbonate including at least one of manganese (Mn), vanadium (V), chromium (Cr), iron (Fe), nickel (Ni), cobalt (Co), copper (Cu), and zinc (Zn) as the first accessory component may be included in a content of 0.1 to 2.0 mol % based on 100 mol % of the base material powder.

The first accessory component may degrade sintering temperature of a multilayer ceramic capacitor with dielectric ceramic composition applied thereto and may enhance the high-temperature withstanding-voltage characteristics of the multilayer ceramic capacitor.

A content of the first accessory component and a content of a second accessory component to be described below may be defined as an included amount based on 100 mol % of the base material powder, in particular, mol % of metallic ions included in each accessory component.

When a content of the first accessory component is less than 0.1 mol %, sintering temperature may be increased and high-temperature withstanding-voltage characteristics may be slightly degraded.

When a content of the first accessory component is equal to or greater than 2.0 mol %, high-temperature withstanding-voltage characteristics and room-temperature resistivity may be degraded.

In particular, the dielectric ceramic composition according to an exemplary embodiment in the present disclosure may further include a first accessory component with a content of 0.1 to 2.0 mol % based on 100 mol % of the base material powder and, thus, it may be possible to sinter the ceramic composition at low temperature and excellent high-temperature withstanding-voltage characteristics may be achieved.

c) Second Accessory Component

According to an exemplary embodiment in the present disclosure, the dielectric ceramic composition may include an oxide including silicon (Si) or a glass compound including Si as the second accessory component.

The dielectric ceramic composition may further include 0.2 to 5.0 mol % of the second accessory component as an oxide including Si or a glass compound including Si based on 100 mol % of the base material powder particles.

The second accessory component may degrade sintering temperature of a multilayer ceramic capacitor with dielectric ceramic composition applied thereto and may enhance high-temperature withstanding-voltage characteristics.

When a content of the second accessory component is less than 0.2 mol % based on 100 mol % of the base material powder, sintering temperature may be increased.

When a content of the second accessory component is equal to or greater than 5.0 mol % based on 100 mol % of the base material powder, high-temperature withstanding-voltage characteristics may be degraded.

In particular, the dielectric ceramic composition according to an exemplary embodiment in the present disclosure may further include a second accessory component with a content of 0.2 to 5.0 mol % based on 100 mol % of the base material powder and, thus, it may be possible to sinter the dielectric ceramic composition at low temperature and excellent high-temperature withstanding-voltage characteristics may be achieved.

d) Third Accessory Component

According to an exemplary embodiment in the present disclosure, the dielectric ceramic composition may further include a third accessory component as an oxide, carbonate, or fluoride including lithium (Li).

The dielectric ceramic composition may further include 0.4 to 12.0 mol % of the third accessory component as an oxide, carbonate, or fluoride including lithium (Li) based on 100 mol % of the base material powder.

The third accessory component may degrade sintering temperature of a multilayer ceramic capacitor with dielectric ceramic composition applied thereto and may enhance high-temperature withstanding-voltage characteristics.

When copper (Cu) is used to form an internal electrode, the third accessory component may also achieve target characteristics of the multilayer ceramic capacitor.

When a content of the third accessory component is less than 0.4 mol % based on 100 mol % of the base material powder, sintering temperature may be increased, a dielectric constant may be lowered, and high-temperature withstanding-voltage characteristics may be degraded.

When a content of the third accessory component is equal to or greater than 12.0 mol % based on 100 mol % of the base material powder, high-temperature withstanding-voltage characteristics may be degraded due to generation of a secondary phase or the like.

In particular, the dielectric ceramic composition according to an exemplary embodiment in the present disclosure may further include a third accessory component with a content of 0.4 to 12.0 mol % based on 100 mol % of the base material powder 100 and, thus, copper (Cu) may be used to form an internal electrode, it may be possible to sinter the dielectric ceramic composition at low temperature, and excellent high-temperature withstanding-voltage characteristics may be achieved.

e) Fourth Accessory Component

According to an exemplary embodiment in the present disclosure, the dielectric ceramic composition may further include a fourth accessory component that is an oxide, carbonate, or fluoride including barium (Ba).

The dielectric ceramic composition may further include 0 to 3.0 at % of the fourth accessory component based on at % of barium (Ba), as an oxide, carbonate, or fluoride including barium (Ba), with respect to 100 wt % of the base material powder.

The fourth accessory component may enhance a dielectric constant of the multilayer ceramic capacitor with the dielectric ceramic composition applied thereto.

When copper (Cu) is used to form an internal electrode and is sintered in a reduction condition ($N_2$ atmosphere), the fourth accessory component may also achieve the target characteristics of the multilayer ceramic capacitor.

When a content of the fourth accessory component is greater than 3.0 at % based on at % of barium (Ba) with respect to 100 mol % of the base material powder, high-temperature withstanding-voltage characteristics may be degraded.

In particular, the dielectric ceramic composition according to an exemplary embodiment in the present disclosure may further include 0 to 3.0 at % of the fourth accessory component based on at % of barium (Ba), as an oxide, carbonate, or fluoride including barium the base material powder and, form an internal electrode, (Ba), with respect to 100 wt % of thus, copper (Cu) may be used to t may be possible to sinter the dielectric ceramic composition in a reduction condition, and a high dielectric constant and excellent high-temperature withstanding-voltage characteristics may be achieved.

The fourth accessory component according to an exemplary embodiment in the present disclosure may include barium (Ba) to satisfy a molar ratio of Ba/Si of 0 to 4.0.

A molar ratio of the second accessory component including an oxide including Si or a glass compound including Si and the fourth accessory component may be adjusted to satisfy 0 to 4.0 to achieve a high dielectric constant and, simultaneously, to achieve excellent high-temperature withstanding-voltage characteristics.

In detail, when a content of barium (Ba) of the fourth accessory component as an oxide, carbonate, or fluoride including barium (Ba) is greater than 3.0 at %, a content of silicon (Si) as the second accessory component may also be adjusted to satisfy a molar ratio of Ba/Si of 4.0 and, thus, high-temperature withstanding-voltage characteristics may also be enhanced.

However, when a molar ratio of Ba/Si is greater than 4.0, withstanding voltage characteristics may be degraded and a problem may arise in terms of reliability.

f) Fifth Accessory Component

According to an exemplary embodiment in the present disclosure, the dielectric ceramic composition may further include a fifth accessory component as an oxide, carbonate, or fluoride including at least one of dysprosium (Dy), yttrium (Y), holmium (Ho), samarium (Sm), gadolinium (Gd), erbium (Er), lanthanum (La), and terbium (Tb).

The dielectric ceramic composition may further include the fifth accessory component with a content of 0 to 4.0 at % based on at % of each component, as an oxide, carbonate, fluoride including at least one of dysprosium (Dy), yttrium (Y), holmium (Ho), samarium (Sm), gadolinium (Gd), erbium (Er), lanthanum (La), and terbium (Tb), with respect to 100 mol % of the base material powder.

The fifth accessory component may enhance the DC-bias characteristics of a multilayer ceramic capacitor with dielectric ceramic composition applied thereto and enhance high-temperature withstanding voltage, thereby enhancing reliability.

When a content of the fifth accessory component is greater than 4.0 at % based on at % of each component with respect to 100 mol % of the base material powder, a room-temperature dielectric constant may be reduced and, thus, it may not be possible to achieve target characteristics.

In particular, the dielectric ceramic composition according to an exemplary embodiment in the present disclosure may further include the fifth accessory component with a content of 0 to 4.0 at % based on at % of each component, as an oxide, carbonate, or fluoride including at least one of dysprosium (Dy), yttrium (Y), holmium (Ho), samarium (Sm), gadolinium (Gd), 10 erbium (Er), lanthanum (La), and terbium (Tb) with respect to 100 mol % of the base material powder and, thus, DC-bias characteristics may be enhanced and high-temperature withstanding voltage may be increased, thereby enhancing reliability.

Referring to FIG. 4, a thickness t3 of a region of the dielectric layer 111, in which a content of nickel (Ni) is equal to or less than 3 wt % from a boundary of each of the first and second internal electrodes 121 and 122 and a thickness t2 of each of the first and second internal electrodes 121 and 122 may satisfy t2>t3.

According to an exemplary embodiment in the present disclosure, the dielectric layer 111 may include two types of main components of a first main component represented by $(Ba_{(1-x)}Ca_x)TiO_3$ and a second main component represented by $BaTi_2O_5$ and, thus, the thickness t3 of the region of the dielectric layer 111, in which a content of nickel (Ni) is equal to or less than 3 wt %, may be smaller than the thickness t2 of the first and second internal electrodes 121 and 122.

As such, a problem in that nickel (Ni) is diffused into the dielectric layer may be minimized and, thus, a dielectric constant may be prevented from being lowered to embody a high-capacitance multilayer ceramic capacitor.

On the other hand, to stably ensure a high-temperature capacitance variation rate, when $BaTi_2O_5$ is used as a main component or is used alone, the thickness t3 of a region of the dielectric layer, in which a content of nickel (Ni) is equal to or less than 3 wt %, may be greater than the thickness t2 of the first and second internal electrodes.

In this case, there is a problem in that a dielectric constant of a multilayer ceramic capacitor is lowered.

Referring to FIG. 4, in the multilayer ceramic electronic component according to an exemplary embodiment in the present disclosure, a thickness t1 of the dielectric layer 111 and the thickness t2 of the internal electrodes 121 and 122 may satisfy t1>2×t2.

That is, according to an exemplary embodiment in the present disclosure, the thickness t1 of the dielectric layer 111 may be twice greater than the thickness t2 of the internal electrodes 121 and 122.

In general, a high-voltage electrical electronic component has a problem in terms of reliability as an important issue due to degradation of a dielectric breakdown voltage in a high-voltage environment.

The multilayer ceramic capacitor according to an exemplary embodiment in the present disclosure may be configured in such a way that the thickness t1 of the dielectric layer 111 is twice greater than the thickness t2 of the internal electrodes 121 and 122 to prevent a dielectric breakdown voltage from being degraded in a high-voltage environment to increase a thickness of a dielectric layer as a clearance between internal electrode, thereby enhancing dielectric breakdown voltage characteristics.

When the thickness t1 of the dielectric layer 111 is twice or less than the thickness t2 of the internal electrodes 121 and 122, the thickness of the dielectric layer as a clearance between internal electrodes is small, thereby lowering a dielectric breakdown voltage.

The thickness t2 of the internal electrode may be less than 2 μm and a thickness td of the dielectric layer may be less than 10.0 μm but the present disclosure is not limited thereto.

Figure 5:
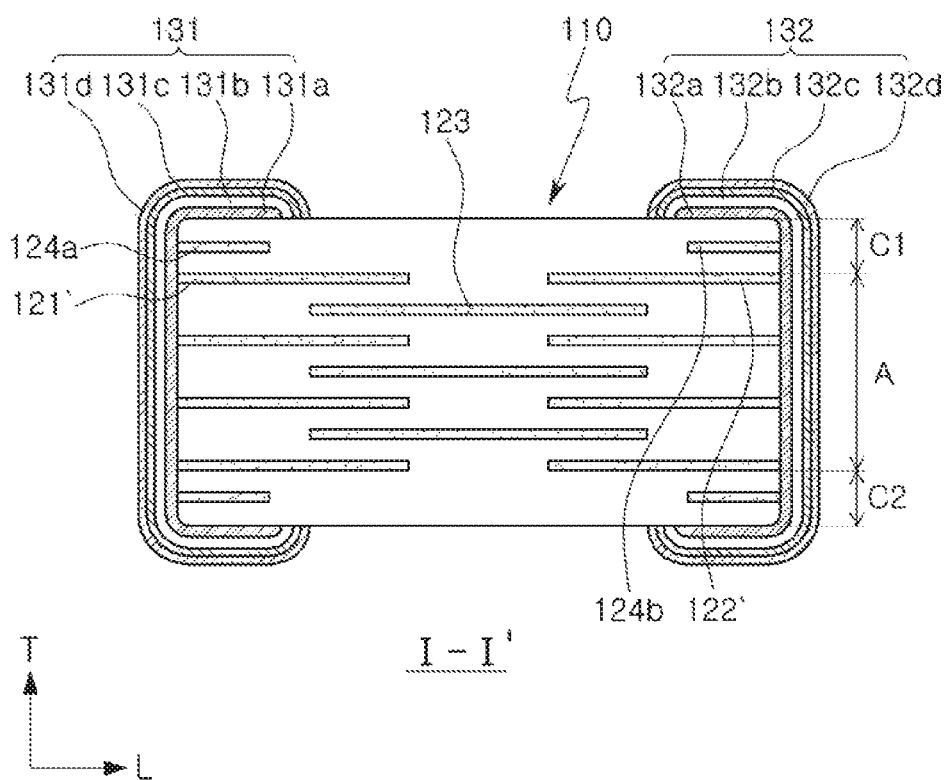
FIG. 5 is a cross-sectional view taken along I-I' of FIG. 1 according to another exemplary embodiment in the present disclosure.

FIG. 5 is a cross-sectional view taken along I-I' of FIG. 1 according to another exemplary embodiment in the present disclosure.

Referring to FIG. 5, the multilayer ceramic capacitor according to another exemplary embodiment in the present disclosure may further include a plurality of floating electrodes 123 that are alternately disposed with respect to first and second internal electrodes 121' and 122' in the thickness direction in the ceramic body 110 and have opposite end portions that overlap with predetermined portions of the first and second internal electrodes 121' and 122'.

The first and second internal electrodes 121' and 122' may have different polarities, may be simultaneously formed on at least one surface of a ceramic sheet for forming the dielectric layer 111 to be spaced apart from each other, and may be respectively exposed through opposite end surfaces of the ceramic body 110 in the ceramic body 110.

As such, the first and second internal electrodes 121' and 122' that are exposed through the opposite end surfaces of the ceramic body 110 may be electrically connected to the first and second external electrodes 131 and 132, respectively.

The plurality of floating electrodes 123 may be alternately disposed with respect to the first and second internal electrodes 121' and 122' in the thickness direction in the ceramic body 110 and may have opposite end portions that partially overlap with end portions of the first and second internal electrodes 121' and 122', which are spaced apart from each other.

The plurality of floating electrodes 123 may be configured in such a way that a distance spaced apart from the opposite end surfaces of the ceramic body 110 is equal to or greater than 5% of an entire length of the ceramic body 110.

According to another exemplary embodiment in the present disclosure, first and second dummy electrodes 124a and 124b may be disposed to be spaced apart from each other in the upper cover portion C1 and the lower cover portion C2 that are disposed on upper and lower surfaces of the active portion A, respectively.

The first dummy electrode 124a may be exposed through the same surface as an outer lateral surface of the ceramic body 110, through which the first internal electrode 121' is exposed, and the second dummy electrode 124b may be exposed through the same surface as an outer lateral surface of the ceramic body 110, through which the second internal electrode 122' is exposed.

The first dummy electrode 124a may be exposed through the same surface as an outer lateral surface of the ceramic body 110, through which the first internal electrode 121' is exposed, and the second dummy electrode 124b may be exposed through the same surface as an outer lateral surface of the ceramic body 110, through which the second internal electrode 122' is exposed, thereby enhancing the flexural rigidity of the multilayer ceramic capacitor.

Hereinafter, a method of manufacturing a multilayer ceramic electronic component according to an exemplary embodiment in the present disclosure is described but is not limited thereto.

In the method of manufacturing the multilayer ceramic electronic component according to an exemplary embodiment in the present disclosure, a slurry, which is formed by adding a dielectric ceramic composition including a base material main component represented by $z(Ba_{1-x}Ca_x)TiO_3$-$(1-z)BaTi_2O_5$ including a first main component represented by $(Ba_{1-x}Ca_x)TiO_3$ and a second main component represented by $BaTi_2O_5$ in which z satisfies $0.7 \leq z \leq 0.8$ and x satisfies $0 \leq x \leq 0.1$, may be coated and dried on a carrier film to prepare a plurality of ceramic green sheets, thereby forming a dielectric layer.

The ceramic green sheet may be manufactured in the form of a sheet with a thickness of several μm by mixing ceramic powder particles, binders, and solvents to prepare slurry and performing a doctor blade method on the slurry.

Then, an average particle size of nickel (Ni) may be 0.1 to 0.2 μm and conductive paste for an internal electrode including nickel (Ni) powder particles with 40 to 50 parts by weight may be prepared.

The conductive paste for the internal electrode may be coated on the green sheet using a screen printing method to form the internal electrode and, then, green sheets on which an internal electrode pattern is disposed may be stacked to prepare the ceramic body 110.

Then, an electrode layer including conductive metal and glass including one or more selected from the group consisting of copper (Cu), silver (Ag), nickel (Ni), and an alloy thereof may be formed on an external surface of the ceramic body.

The glass is not particularly limited and may be a material with the same composition as glass used to manufacture an external electrode of a general multilayer ceramic capacitor.

The electrode layer may be formed on upper and lower surfaces and an end portion of the ceramic body and, thus, may be electrically connected to the first and second internal electrodes.

The electrode layer may include 5 vol % of glass based on conductive metal.

Then, conductive resin composition may be coated and, then, hardened on the electrode layers 131a and 132a to form the conductive resin layers 131b and 132b.

The conductive resin layers 131b and 132b may include conductive metal and base resin including one or more selected from the group consisting of copper (Cu), silver (Ag), nickel (Ni), and an alloy thereof and the base resin may be epoxy resin.

Then, the Ni plating layers 131c and 132c may be formed on the conductive resin layers 131b and 132b and the Pd plating layers 131d and 132d may be formed on the Ni plating layers 131c and 132c.

Table 1 below shows a measurement result of a dielectric constant, resistivity, and a high-temperature capacitance variation rate (ΔCp @ 200° C.) depending on z and x in a base material main component represented by $z(Ba_{(1-x)}Ca_x)TiO_3$-$(1-z)BaTi_2O_5$ including a first main component represented by $(Ba_{(1-x)}Ca_x)TiO_3$ and a second main component represented by $BaTi_2O_5$, which are included in a dielectric ceramic composition.

The cases in which a dielectric constant is equal to or greater than 800 are determined to be satisfactory as Inventive Examples and the case in which a dielectric constant is less than 800 are determined to be poor as Comparative Examples.

The cases in which resistivity is equal to or greater than 1.0e10 Ωcm are determined to be satisfactory as Inventive Examples and the cases in which resistivity is less than 1.0e10 Ωcm are determined to be poor as Comparative Examples.

The cases in which a high-temperature capacitance variation rate (ΔCp @ 200° C.) at temperature of 200° C. is equal to less than −15% are determined to be satisfactory as Inventive Examples and the cases in which the high-temperature capacitance variation rate (ΔCp @ 200° C.) at temperature of 200° C. is greater than −15% are determined to be poor as Comparative Examples.

TABLE 1

|  | z | x | dielectric constant | resistivity (Ωcm) | ΔCp @ 200° C. |
| --- | --- | --- | --- | --- | --- |
| *1 | 0.6 | 0 | 630 | 7.63e9 | −3.6% |
| *2 | 0.6 | 0.05 | 596 | 7.21e9 | −2.9% |
| *3 | 0.6 | 0.07 | 577 | 6.57e9 | −2.3% |
| *4 | 0.6 | 0.10 | 546 | 4.13e9 | −0.6% |
| 5 | 0.7 | 0 | 882 | 1.21e10 | −6.6% |
| 6 | 0.7 | 0.05 | 847 | 1.13e10 | −5.2% |
| 7 | 0.7 | 0.07 | 811 | 1.08e10 | −4.5% |
| *8 | 0.7 | 0.10 | 780 | 8.98e9 | −2.9% |
| 9 | 0.8 | 0 | 1320 | 2.37e10 | −14.3% |
| 10 | 0.8 | 0.05 | 1252 | 2.14e10 | −12.1% |
| 11 | 0.8 | 0.07 | 1208 | 1.98e10 | −11.3% |
| *12 | 0.9 | 0 | 1624 | 3.45e10 | −25.1% |
| *13 | 0.9 | 0.10 | 1489 | 1.88e10 | −19.6% |

*Comparative Example

As seen from Table 1 above, Samples 1 to 4 as Comparative Examples correspond to the cases in which z is 0.6 and, in this case, a dielectric constant and a resistivity value are lower than a target value according to the present disclosure.

On the other hand, it may be seen that Samples 5 to 7 and 9 to 11 as Inventive Examples correspond to the cases in which z and x satisfy a numerical range according to the present disclosure and, in this case, all of a dielectric constant, resistivity, and high-temperature capacitance variation rate are satisfactory.

It may be seen that, Sample 8 as Comparative Example corresponds to the case in which x is 10 and, in this case, a dielectric constant and a resistivity value are lower than a target value according to the present disclosure.

It may be seen that, Samples 12 and 13 as other Comparative Examples correspond to the case in which z is 0.9 and, in this case, there is a problem in that a dielectric constant and a resistivity value are higher than a target value but a high-temperature capacitance variation rate is higher than a target value according to the present disclosure.

As set forth above, according to an exemplary embodiment in the present disclosure, a dielectric layer includes two types of main components of a first main component represented by $(Ba_{(1-x)}Ca_x)TiO_3$ and a second main component represented by $BaTi_2O_5$ and, in this case, contents of each component may be adjusted to stably ensure a high-temperature capacitance variation rate and, simultaneously, to embody a high-capacitance multilayer ceramic capacitor.

While exemplary embodiments have been shown and described above, it will be apparent to those skilled in the art that modifications and variations could be made without departing from the scope of the present invention as defined by the appended claims.

What is claimed is:

1. A dielectric ceramic composition, comprising:
a base material main component represented by $z(Ba_{(1-x)}Ca_x)TiO_3$-$(1-z)BaTi_2O_5$, including a first main component represented by $(Ba_{(1-x)}Ca_x)TiO_3$ and a second main component represented by $BaTi_2O_5$, $0.7 \le z \le 0.8$ and $0 < x \le 0.1$;
a first accessory component including at least one selected from the group consisting of manganese (Mn), vanadium (V), chromium (Cr), iron (Fe), nickel (Ni), cobalt (Co), copper (Cu), and zinc (Zn);
a second accessory component including at least one selected from the group consisting of an oxide including silicon (Si) and a glass compound including Si;
a third accessory component including at least one select from the group consisting of an oxide, a carbonate and a fluoride including lithium (Li);
a fourth accessory component including at least one selected from the group consisting of an oxide, a carbonate and a fluoride including barium (Ba); and
a fifth accessory component including at least one selected from the group consisting of an oxide, a carbonate and a fluoride including at least one selected from the group consisting of an oxide, carbonate, or fluoride including at least one of dysprosium (Dy), yttrium (Y), holmium (Ho), samarium (Sm), gadolinium (Gd), erbium (Er), lanthanum (La), and terbium (Tb).

2. The dielectric ceramic composition of claim 1, wherein a content of the first accessory component is 0.1 mol to 2.0 mol based on 100 mol of the base material main component.

3. The dielectric ceramic composition of claim 1, wherein a content of the second accessory component is 0.2 mol to 5.0 mol based on 100 mol of the base material main component.

4. The dielectric ceramic composition of claim 1, wherein a content of the third accessory component is 0.4 mol to 12.0 mol based on 100 mol of the base material main component.

5. The dielectric ceramic composition of claim 1, wherein a molar ratio (Ba/Si) of barium (Ba) to Silicon (Si) is 4.0 or less.

6. The dielectric ceramic composition of claim 1, wherein the base material main component is a solid solution of the first main component and the second main component.

7. The dielectric ceramic composition of claim 1, wherein an average particle diameter of the base material main component is 150 nm or less.

8. The dielectric ceramic composition of claim 1, wherein $0 < x \le 0.07$.

9. The dielectric ceramic composition of claim 1, wherein $0.05 < x \le 0.07$.

* * * * *